US011353141B2

(12) United States Patent
Wilson

(10) Patent No.: US 11,353,141 B2
(45) Date of Patent: Jun. 7, 2022

(54) APPARATUS AND METHOD FOR CONTROLLING CONDUIT

(71) Applicant: Honda Motor Co., Ltd., Tokyo (JP)

(72) Inventor: Tim A Wilson, Urbana, OH (US)

(73) Assignee: Honda Motor Co., Ltd., Tokyo (JP)

(*) Notice: Subject to any disclaimer, the term of this patent is extended or adjusted under 35 U.S.C. 154(b) by 106 days.

(21) Appl. No.: 16/811,413

(22) Filed: Mar. 6, 2020

(65) Prior Publication Data
US 2021/0278015 A1  Sep. 9, 2021

(51) Int. Cl.
*F16L 3/12* (2006.01)
*F16L 3/16* (2006.01)
*F16M 13/02* (2006.01)

(52) U.S. Cl.
CPC ............ *F16L 3/1226* (2013.01); *F16L 3/16* (2013.01); *F16M 13/02* (2013.01)

(58) Field of Classification Search
CPC .......... F16L 3/1226; F16L 3/16; F16M 13/02; B23K 9/32; F16B 2/065; F16B 11/006; F16B 45/02
USPC .................................................... 248/49, 58
See application file for complete search history.

(56) References Cited

U.S. PATENT DOCUMENTS

| | | | | |
|---|---|---|---|---|
| 3,023,990 A | * | 3/1962 | Gunthel, Jr. ........... | H01B 17/16 248/70 |
| 3,188,030 A | * | 6/1965 | Fischer .................. | F16L 3/222 248/68.1 |
| 4,128,220 A | | 12/1978 | McNeel | |
| 6,945,501 B2 | | 9/2005 | Thompson | |
| 8,020,814 B2 | | 9/2011 | Geppert et al. | |
| 8,161,605 B2 | | 4/2012 | Reichel | |
| 8,985,532 B2 | * | 3/2015 | Chirpich ............. | A01M 7/0053 248/68.1 |
| 10,999,984 B1 | * | 5/2021 | Shelton .................... | A01G 9/02 |
| 2004/0245416 A1 | * | 12/2004 | Attee ..................... | F16M 13/02 248/214 |
| 2006/0065684 A1 | | 3/2006 | Houcek | |

(Continued)

FOREIGN PATENT DOCUMENTS

| FR | 1404085 A | 6/1965 |
|---|---|---|
| KR | 19980014729 U | 6/1998 |
| KR | 200424650 Y1 | 8/2006 |

OTHER PUBLICATIONS

Conduit & Cable Balancers & Hangers; Wizard Gear http://www.wire-wizard.com/newsletter/1-25-18.html.

(Continued)

*Primary Examiner* — Muhammad Ijaz
(74) *Attorney, Agent, or Firm* — Joshua Freier; American Honda Motor Co., Inc.

(57) ABSTRACT

A conduit-balancer link system may be used to control the path of conduit in a robotic welding process. The conduit-balancer link system includes a first member having a leg portion with an interior surface and an outer portion attachable to a balancing member. The conduit-balancer link system also includes a second member having a generally u-shaped outer profile with two parallel extending members. A conduit is routed between the interior surface of the first member and an inner portion of the second member. Fasteners are used to secure the second member to the first member with the conduit routed between.

15 Claims, 5 Drawing Sheets

(56) References Cited

U.S. PATENT DOCUMENTS

2012/0205499 A1* 8/2012 Shelton .............. F16L 3/1091
248/62
2019/0249801 A1 8/2019 Estepp et al.

OTHER PUBLICATIONS

Retractable Conduit Balancer; Lincoln Electric https://www.lincolnelectric.com/en-us/equipment/accessories/Pages/product.aspx?product=AD1329-548 (LincolnElectric).

* cited by examiner

APPARATUS AND METHOD FOR CONTROLLING CONDUIT

BACKGROUND

In a manufacturing environment with welding operations, the welding is often performed with robotic processes. Specifically, metal inert gas (MIG) welding processes are frequently completed by robotic welders. MIG welding requires welding electrode wire to be routed from a spool to a welding gun. For robotic MIG welding processes, the welding gun, which includes a nozzle at the end of the welding gun, is mounted to a moveable arm of the robotic welder. Specifically, the welding gun may be mounted on what is known as an end of arm tooling (EOAT) of the robotic welder.

The electrode wire must be routed from its spool or source to the welding gun without being damaged, intertwined or tangled. Electrode wire may be routed inside conduit or some type of tooling to prevent damage. However, the path of the conduit must be controlled to prevent it from being intertwined or tangled during the robotic MIG welding or other manufacturing process.

The path of the conduit may be partially controlled by attaching a point on the conduit to a balancing member. The balancing member may be mounted above a base of the robot. Additionally, the path of the conduit may also be controlled by a conduit mount secured to the conduit. It is critical to maintain the conduit position while the robot is in motion to keep the two from getting intertwined or tangled and to keep the conduit from bending too sharply causing the movement of the electrode wire to be restricted through the conduit. Therefore it is advantageous to have a conduit mount secured to the conduit with an opening for attaching to the balancing member to control the position of the conduit.

BRIEF SUMMARY

According to one aspect, a conduit-balancer link system includes a first member having a leg portion with an interior surface and an outer portion with an opening. The leg portion of the first member includes at least one threaded opening. The opening of the first member is attachable to a balancing member. A second member has a generally u-shaped outer profile that includes two parallel extending members and an inner portion. The two parallel extending members include a mounting hole. The second member is secured to the first member by aligning the mounting hole of the two parallel extending members to the at least one threaded opening of the first member. A conduit is held in an area created between the interior surface of the first member and the inner portion of the second member.

According to another aspect, a conduit-balancer link system includes a first member having a leg portion with a c-shaped extension and an outer portion attachable to a balancing member. The conduit-balancer link system also includes a second member having a generally u-shaped outer profile that includes two parallel extending members. The two parallel extending members have an aligning surface. The aligning surface is between the outer portion and the c-shaped extension of the first member and a conduit is routed between the c-shaped extension of the first member and an inner portion of the second member.

According to a further aspect, a method for method for using a conduit-balancer link system to control the path of conduit in a robotic welding process comprising by attaching a hook from a balancing member to a first member of a conduit-balancer link system. Placing conduit along an interior surface of a leg portion of the first member. Aligning a generally u-shaped second member to the leg portion of the first member while the conduit is positioned between the interior surface of the first member and an inner portion of the second member and securing the second member to the first member with fasteners.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments are hereinafter described in detail in connection with the views and examples of FIGS. 1-7, wherein like numbers indicate the same or corresponding elements throughout the views. It should, of course, be understood that the description and drawings herein are merely illustrative and that various modifications and changes can be made in the structures disclosed without departing from the concepts of the present disclosure.

Figure 1:
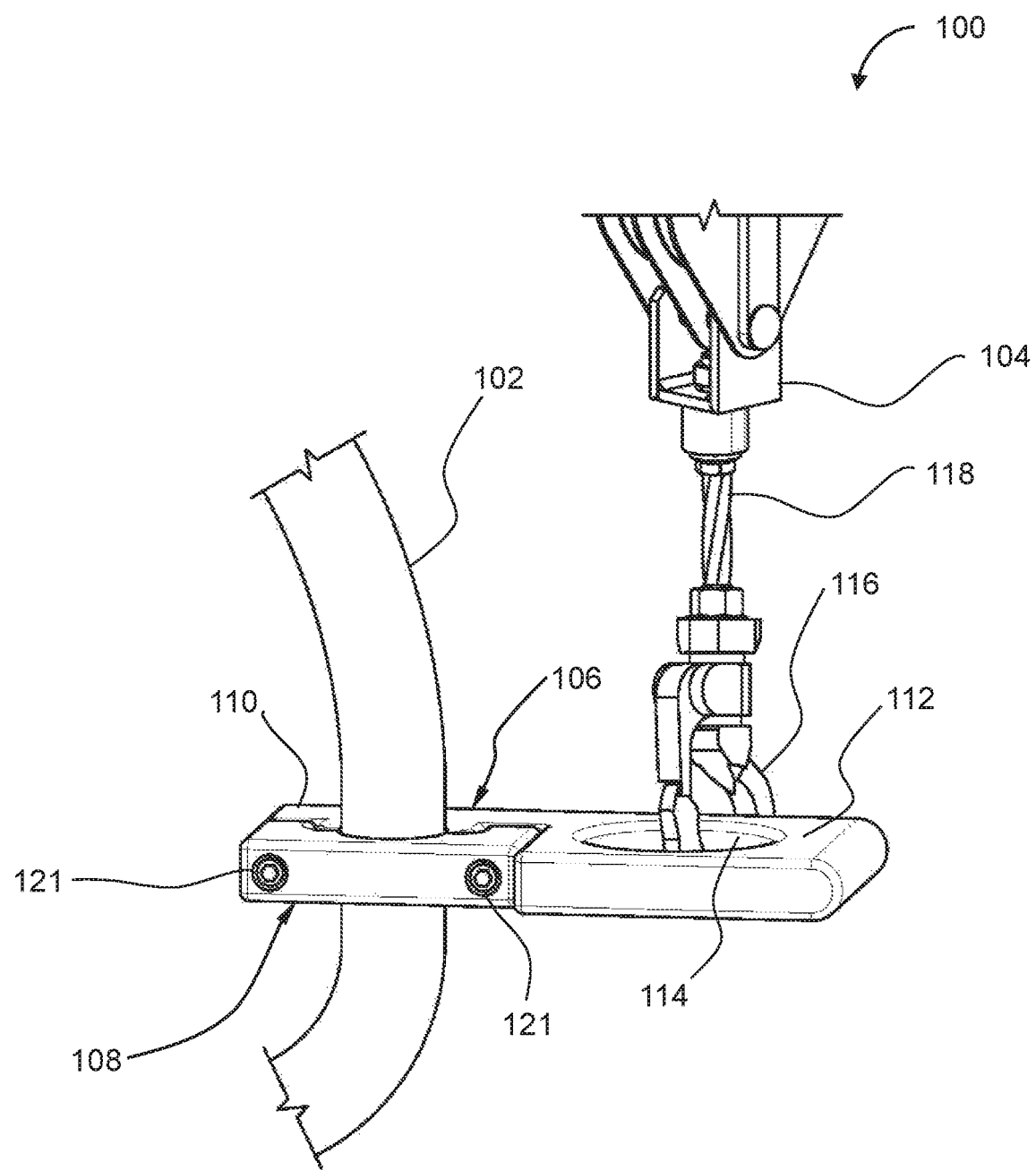
FIG. 1 is a perspective view of a conduit-balancer link system attached to a balancing member.

FIG. 1 is a perspective view of a conduit-balancer link system 100. In FIG. 1, the conduit-balancer link system 100 depicts a conduit 102 passing through the conduit balancer link 100. The conduit balancer link 100 is attached to a balancing member 104. The conduit balancer link 100 includes a first member 106 and a second member 108. The second member 108 is secured to the first member 106. The second member 108 may be secured to the first member 106 with fasteners 121, as shown in FIG. 1. The first member 106 includes a leg portion 110 and an outer portion 112. The outer portion 112 includes an opening 114.

The opening 114 of the outer portion 112 may be securable to the balancing member 104, as shown in FIG. 1. Specifically, the opening 114 of the conduit-balancer link system 100 is attached to a hook 116 of the balancing member 104. The balancing member 104 may include a cable 118 extending downward from the balancing member 104 with the hook 116 attached to the end of the cable 118. The hook 116 may comprise an s-hook, a carabiner, or any other attachment mechanism capable of coupling the balancing member 104 to the conduit-balancer link system 100. The balancing member 104 may be a tool balancer, load balancer, spring balancer, rail, cable, or other support member common in the industry that is capable of applying tension to the conduit 102 to control its position. The position of the conduit 102 may need to be controlled in robotic manufacturing process. For example, in robotic metal inert gas (MIG) welding processes, MIG wire may be routed inside the conduit and supplied to a welding gun mounted to a moveable arm of the robotic welder (not shown). The position of the conduit 102 is maintained by the balancing member 104 as the robotic welder is in motion.

Figure 2:
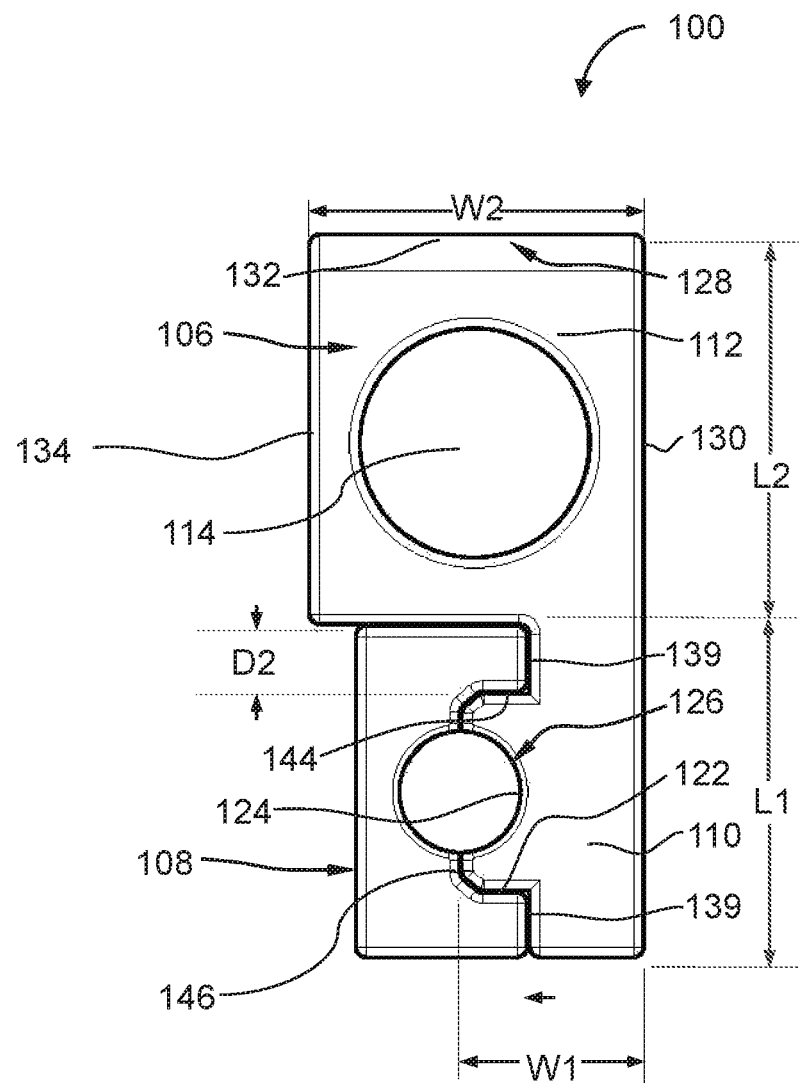
FIG. 2 is a bottom view of the conduit-balancer link system attached to the balancing member.

FIG. 2 is a bottom view of the conduit-balancer link system 100 of FIG. 1. The outer portion 112 of the first member 106 may be rectangular shaped. However, any shape may be used which provides enough area for the opening 114 to be attached to the hook 116 of the balancing member 104. As shown in FIG. 1, the conduit-balancer link system 100 may include a horizontal orientation in relation to the conduit 102. Additionally, the conduit-balancer link system 100 may also include a horizontal orientation in relation to the balancing member 104 or the cable 118 of the balancing member 104, also shown in FIG. 1.

The leg portion 110 of the first member 106 may have a width W1 that is generally half of a width W2 of the outer portion 112. Also, the leg portion 110 may have a length L1 that is generally the same as a length L2 of the outer portion 112, as shown in FIG. 2. The width and length of these features may help with balance after the conduit-balancer link system 100 is secured to the conduit 102 with the second member 108 and fasteners 121.

Figure 3:
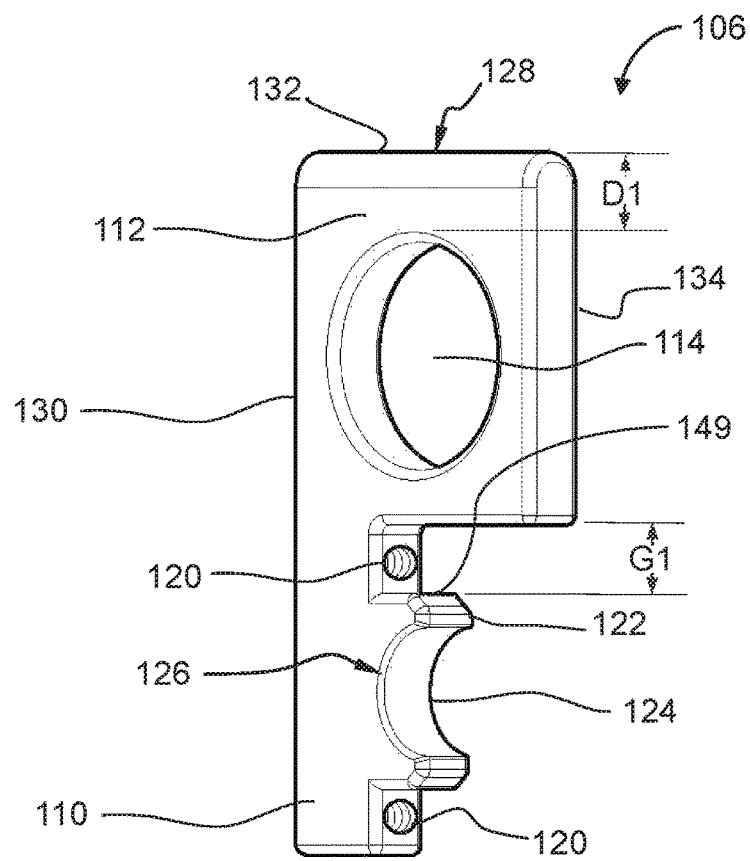
FIG. 3 is a perspective view of a first member of the conduit-balancer link system shown in FIG. 2.

FIG. 3 is a perspective view of the first member 106 of the conduit-balancer link system 100. The leg portion 110 of the first member 106 includes at least one threaded opening 120. The threads may extend the entire depth of the at least one threaded opening 120 or a partial depth of the at least one threaded opening 120. The leg portion 110 of the first member 106 may include a c-shaped extension 122. The c-shaped extension 122 may be located between the two threaded openings 120 as shown in FIG. 3. Additionally, an interior surface 124 of the c-shaped extension 122 may include a cut-out 126. The cut-out 126 may be arc-shaped, as shown in FIG. 3, to conform to a portion the conduit 102.

In addition, FIG. 3 depicts the outer portion 112 of the first member 106. The opening 114 may be generally centered in the outer portion 112. The opening 114 is envisioned to be generally circular, as shown in FIG. 3, but any shape can be used which allows the first member 106 to be attached to the hook 116 of the balancing member 104. The opening 114 may be sized so that the hook 116 may move along the opening 114. The distance D1 between the opening 114 and an outer surface 128 of the outer portion 112 is sized to allow the 116 to move along the outer surface 128. To illustrate, as the conduit 102 moves during the manufacturing process the hook 116 may move from a first surface 130, to a second surface 132 or a third surface 134 of the outer portion 112. In FIG. 1, the hook 116 is attached to the first surface 130 of the outer portion 112. Alternatively, the outer portion 112 may be generally round in shape with no defined sides for the hook 116 to be located.

Figure 4:
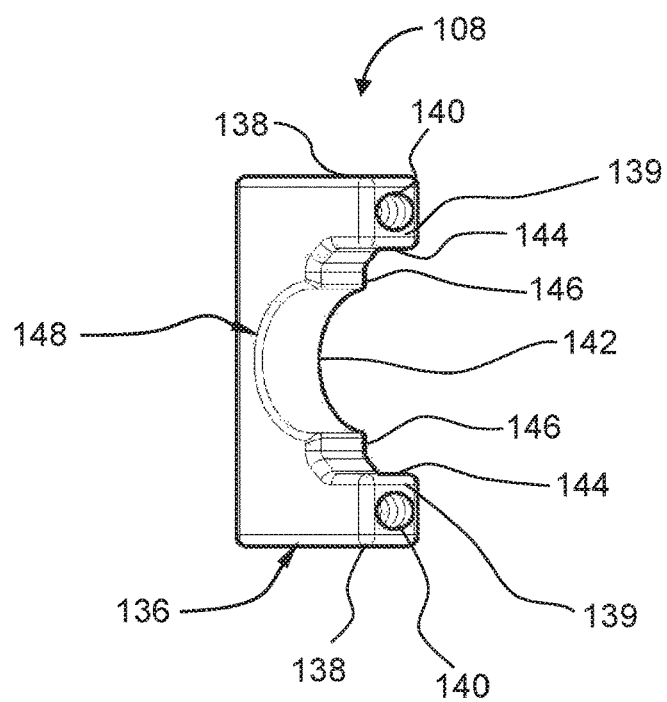
FIG. 4 is a perspective view of a second member of the conduit-balancer link system shown in FIG. 2.

FIG. 4 is a perspective view of the second member 108 of the conduit-balancer link system 100. The second member 108 may have a generally u-shaped outer profile 136. The second member 108 includes parallel extending members 138. The parallel extending members 138 include an aligning surface 139. In addition, the parallel extending members 138 include a mounting hole 140. The mounting hole 140 of the parallel extending members 138 may be centered in the aligning surface 139, as shown in FIG. 4. The mounting hole 140 may be threaded, as shown in FIG. 4. However, only a portion of the mounting hole 140 may be threaded (not shown) or the first member 106 may be secured to the second member 108 with a nut and bolt (not shown) in place of the mounting hole 140 being threaded. It is well known to use a nut and bolt in place of the individual components to be assembled having their own threads.

The second member 108 includes an inner portion 142. The inner portion 142 is located between the parallel extending members 138 and inner portion 142 may include vertical portion 144 and horizontal portion 146, as shown in FIGS. 2 and 4. Additionally, the inner portion 142 may include a cut-out 148. The cut-out 148 may be inward from the horizontal portion 146 of the inner portion 142, as shown in FIG. 4. The cut-out 148 may be arc-shaped, as shown in FIG. 4, to conform to a portion the conduit 102. However, the second member 108 may not need a cut-out 148 depending on the shape of the conduit 102 and how securely the conduit 102 needs to be held in the conduit-balancer link system 100. For example, the conduit 102 may be held on the inner portion 142 of the second member 108 between the parallel extending members 138, not shown.

Figure 5:
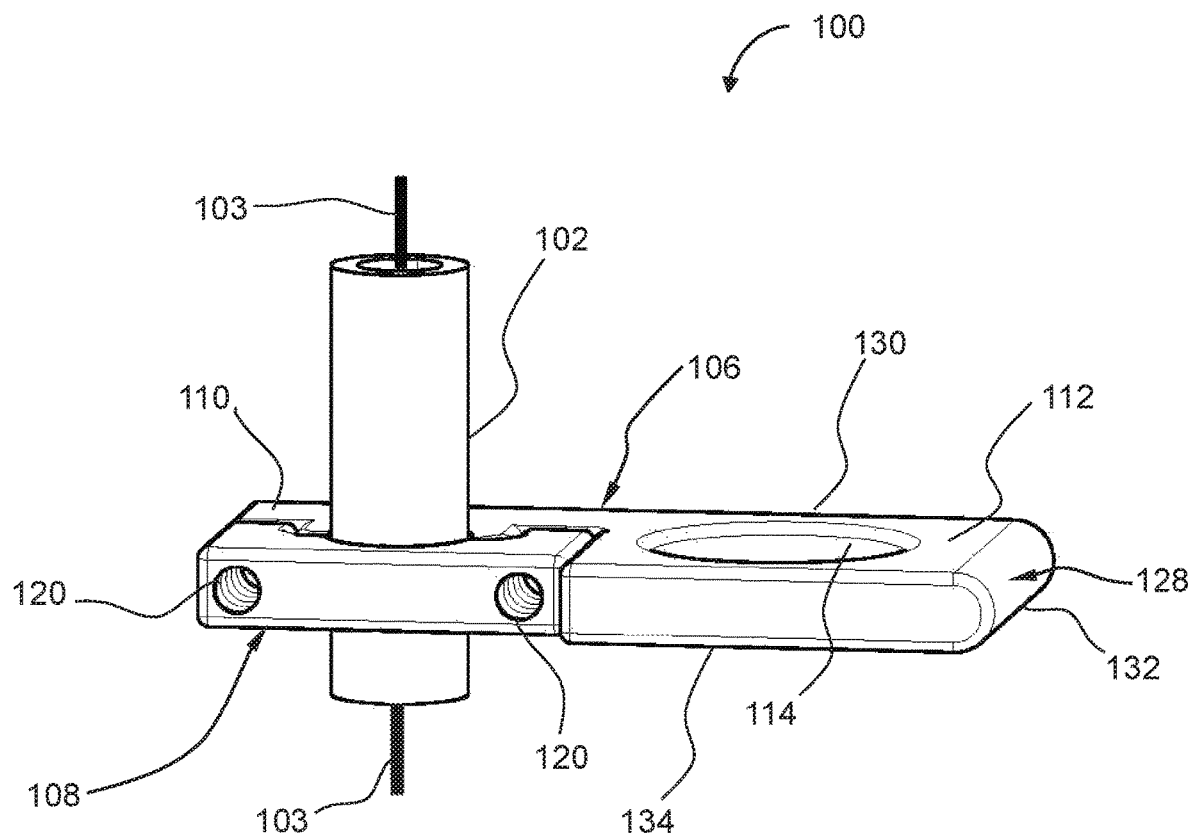
FIG. 5 is a perspective view of the conduit-balancer link system before the first member and a conduit is secured to the second member with fasteners.

The inner portion 142 may have a distance D2, between the aligning surface 139 and the horizontal portion 146 that varies depending on the size of conduit 102, shown in FIG. 2. As shown in FIG. 1 and FIG. 5, the conduit 102 may have a round shape; however, it will be appreciated that any shaped conduit 102 which is securable between the interior surface 124 of the first member 106 and the inner portion 142 of the second member 108 may be used.

FIG. 5 is a perspective view of the conduit-balancer link system before the first member 106 and the conduit 102 is secured to the second member 108 with fasteners 121. The conduit-balancer link system 100 is assembled by placing the conduit 102 along the interior surface 124 of the leg portion 110 of the first member 106. The second member 108 is aligned to the leg portion 110 of the first member 106 with the conduit 102 positioned between the interior surface 124 of the leg portion 100 and the inner portion 142 of the second member 108. Additionally, the parallel extending members 138 of the second member 108 are positioned against the at least one threaded opening 120 of the first member 106. Specifically, the mounting hole 140 of the parallel extending members 138 is aligned to the at least one threaded opening 120 of the first member 106.

Also, a gap G1 between the third surface 134 of the outer portion 112 of the first member 106 and a first extending surface 149 of the c-shaped extension 122, as shown in FIG. 3 may be sized to create a secure fit when aligning the parallel extending members 138, shown in FIGS. 2 and 5. Specifically, the gap G1 of the first member 106 may be sized to be slightly larger than the distance D2 between the aligning surface 139 and the horizontal portion to create the secure fit.

The second member 108 may be secured to the first member 106 with fasteners 121, as shown in FIG. 1. The conduit-balancer link system 100 may be attached to the hook 116 of the balancing member 104, also shown in FIG. 1, as it is being assembled and secured to help with orientation and positioning. FIG. 5 depicts the conduit 102 being tubular and capable of having wire 103 routed through it. The wire 103 may be electrode wire. Specifically, the electrode wire may be metal inert gas (MIG) wire.

Figure 6:
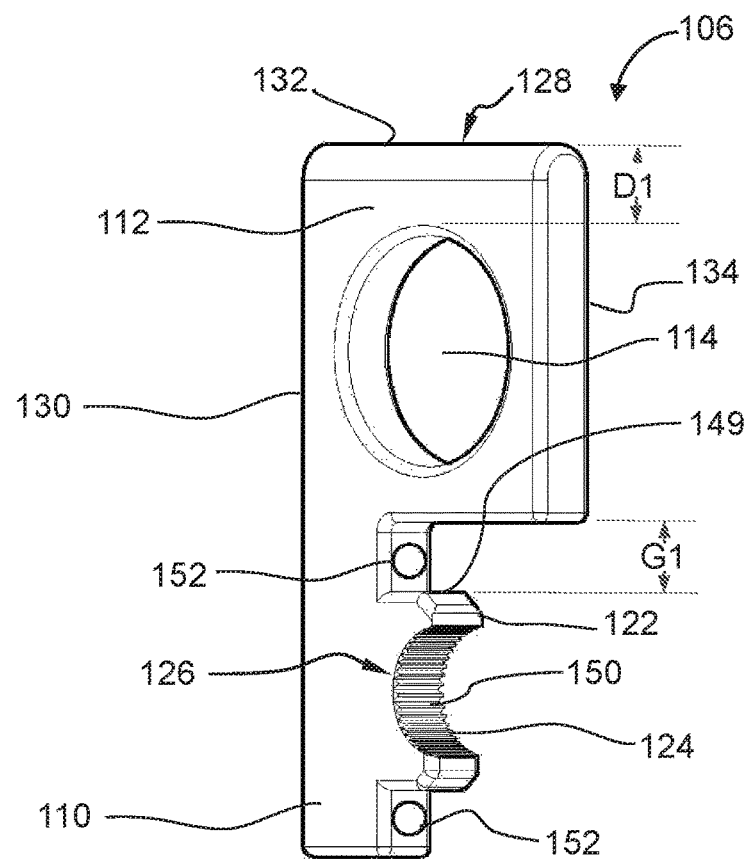
FIG. 6 is perspective view of the first member with a textured surface.

The conduit-balancer link system 100 may include a textured finish 150. FIG. 6 is perspective view of the first member 106 with the textured finish 150 on the interior surface 124. Specifically, the textured surface 150 may be on the cut-out 126 of the interior surface 124. The textured finish 150 may be used to better secure the conduit 102 and prevent sliding or movement. The texture finish 150 may be knurled, as shown in FIG. 6. However, a variety of methods may be used to provide the textured finish 150, such as, but not limited to hatching, coatings, adhesives, and tape. Additionally, the first member 106 may not include at least one threaded hole 120, as shown in FIG. 3. A hole 152 may be used without threads, as shown in FIG. 6.

Figure 7:
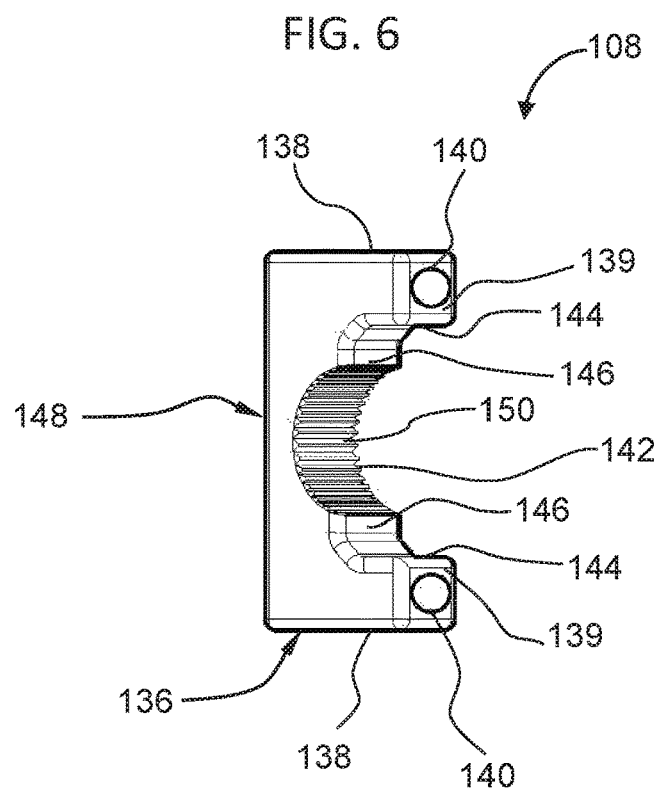
FIG. 7 is perspective view of the second member with the textured surface.

The second member 108 of the conduit-balancer link system 100 may also include the textured finish 150 on the inner portion 142. Specifically, the textured surface 150 may be on the cut-out 148 of the inner portion 142, as shown in FIG. 7. The textured finish 150 on the first member 106 and the second member 108 may be used to better secure the conduit 102 and prevent sliding or movement. The texture finish 150 may be knurled, as shown in FIG. 6 and FIG. 7. However, a variety of methods may be used to provide the textured finish 150, such as, but not limited to hatching, coatings, adhesives, and tape. Additionally, the second member 108 may not include mounting holes with threads, as shown in FIG. 7. Alternatively, the first member 106 may be secured to the second member 108 with a bolt and nut (not shown), which are well known.

In another embodiment, a method for controlling the path of conduit 102 in a robotic welding process is provided. The path of the conduit 102 may be controlled by attaching the hook 116 from the balancing member 104 to the first member 106 of the conduit-balancer link system 100. Placing the conduit 102 along an interior surface 124 of the leg portion 110 of the first member 106. Aligning a generally u-shaped second member 108 to the leg portion 110 of the first member 106 while the conduit 102 is positioned between the interior surface 128 of the leg portion 110 and the inner portion 142 of the second member 108 and securing the second member 108 to the first member 106 with fasteners 121.

The method of for controlling the path of conduit 102 in a robotic welding process may also include orienting the first member 106 so that it is generally horizontal and perpendicular to the balancing member 104, as shown in FIG. 1. Next, placing the aligning surface 139 of the parallel extending members 138 of the second member 108 between the outer portion 112 and the c-shaped extension 122 of the first member 106, as shown in FIG. 2, while the conduit 102 is routed through the cut-out 126 on the interior surface 124 of the first member 106 and the cut-out 148 on the inner portion 142 of the second member 108, as shown in FIG. 5.

A detailed description of the conduit-balancer link system 100 in the second embodiment is omitted here because the same configuration of the first embodiment can be applied thereto.

It will also be understood that the conduit-balancer link system described above can provide a low cost solution for controlling the path of conduit with wire routed inside the conduit to prevent the wire being damaged, intertwined or tangled during a robotic welding or other manufacturing process.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated.

Embodiments are also intended to include or otherwise cover methods of using and methods of manufacturing the conduit-balancer link system disclosed above. The methods of manufacturing include or otherwise cover processors and computer programs implemented by processors used to design various elements of the conduit-balancer link system disclosed above. For example, embodiments are intended to cover processors and computer programs used to design or manufacture the various components of the conduit-balancer link system used for various manufacturing processes.

The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A conduit-balancer link system that includes:
   a first member having a leg portion with an interior surface and an outer portion with an opening;
   the leg portion of the first member includes at least one threaded opening;
   the opening of the first member is attachable to a balancing member;
   a second member having a generally u-shaped outer profile that includes two parallel extending members and an inner portion;
   each of the two parallel extending members include a mounting hole;
   the second member is secured to the first member by aligning the mounting hole of the two parallel extending members to the at least one threaded opening of the first member; and
   a conduit with wire routed inside is held in an area created between the interior surface of the first member and the inner portion of the second member.

2. The conduit-balancer link system of claim 1, wherein the mounting holes are threaded.

3. The conduit-balancer link system of claim 1, wherein the interior surface of the first member and the inner portion of the second member includes a cut-out to allow the conduit to pass through.

4. The conduit-balancer link system of claim 1, wherein the interior surface of the first member and the inner portion of the second member include a textured finish to secure the conduit and prevent movement.

5. The conduit-balancer link system of claim 1, wherein the first member is attached to the balancing member with a hook.

6. The conduit-balancer link system of claim 1, wherein the outer portion of the first member is rectangular with the opening being circular and centered.

7. The conduit-balancer link system of claim 1, wherein the first member is configured to be attached to the balancing member with the second member and the second member is removable from the first member during a change of conduit or wire.

8. The conduit-balancer link system of claim 1, wherein the leg portion of the first member includes a c-shaped extension.

9. The conduit-balancer link system of claim 1, wherein the second member is secured to first member with fasteners.

10. A conduit-balancer link system that includes:
    a first member having a leg portion with a c-shaped extension and an outer portion attachable to a balancing member;
    a second member having a generally u-shaped outer profile that includes two parallel extending members;

the two parallel extending members each having an aligning surface;

the aligning surface is between the outer portion and the c-shaped extension of the first member;

the first member is attached to the balancing member with a hook the second member is removable from the first member during a change of conduit or wire; and a conduit is routed between the c-shaped extension of the first member and an inner portion of the second member.

11. The conduit-balancer link system of claim 10, wherein the outer portion of the first member is rectangular.

12. The conduit-balancer link system of claim 10, wherein the second member is secured to first member with fasteners.

13. The conduit-balancer link system of claim 10, wherein an interior surface of the first member and the inner portion of the second member include a cut-out to allow the conduit to pass through.

14. The conduit-balancer link system of claim 13, wherein the cut-out includes a textured finish to secure the conduit and prevent movement.

15. The conduit-balancer link of claim 10, wherein the conduit includes an opening for weld wire to pass through.

* * * * *